(12) United States Patent
Fennern

(10) Patent No.: US 6,885,720 B2
(45) Date of Patent: Apr. 26, 2005

(54) MODULAR REACTOR CONTAINMENT SYSTEM

(75) Inventor: Larry Edgar Fennern, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,343

(22) Filed: Dec. 17, 2001

(65) Prior Publication Data

US 2003/0112918 A1 Jun. 19, 2003

(51) Int. Cl.$^7$ ................................................. G21C 9/00
(52) U.S. Cl. ..................... 376/283; 376/298; 376/393; 376/294
(58) Field of Search ................. 376/283, 298, 376/393, 294, 293

(56) References Cited

U.S. PATENT DOCUMENTS

| | | | | |
|---|---|---|---|---|
| 3,180,803 A | * | 4/1965 | Gibbons | ..................... 176/56 |
| 3,329,130 A | * | 7/1967 | Cochran | ..................... 122/34 |
| 3,744,660 A | * | 7/1973 | Gaines et al. | ............... 220/582 |
| 3,793,145 A | * | 2/1974 | Jordan et al. | ............... 220/565 |
| 3,937,351 A | * | 2/1976 | Rigg | ..................... 220/560.03 |
| 4,088,535 A | | 5/1978 | Thompson et al. | |
| 4,213,824 A | * | 7/1980 | Jabsen | ....................... 376/283 |
| 4,465,201 A | * | 8/1984 | Chalfant, Jr. | ............... 220/582 |
| 4,576,784 A | * | 3/1986 | Kobayashi | ................... 137/592 |
| 4,668,467 A | * | 5/1987 | Miler et al. | ................. 376/282 |
| 5,059,385 A | | 10/1991 | Gluntz et al. | |
| 5,158,742 A | | 10/1992 | Dillmann | |
| 5,204,054 A | | 4/1993 | Townsend et al. | |
| 5,426,681 A | | 6/1995 | Aburomia | |
| 5,577,085 A | | 11/1996 | Gou et al. | |
| 5,684,846 A | | 11/1997 | Meneely et al. | |
| 6,243,432 B1 | | 6/2001 | Cheung et al. | |
| 6,285,727 B1 | | 9/2001 | Bredolt et al. | |
| 2002/0085660 A1 | * | 7/2002 | Nakamaru et al. | .......... 376/283 |

OTHER PUBLICATIONS

Kessler et al., "Improved Conatinment Concept For Future Pressurized Water Reactors,"Proceedings of the Fifth International Conference on Emerging Nuclear Energy Systems, Karsruhe, Jul. 3–6, 1989.*

* cited by examiner

*Primary Examiner*—Jack Keith
*Assistant Examiner*—R Palabrica
(74) *Attorney, Agent, or Firm*—Armstrong Teasdale LLP

(57) ABSTRACT

A compact metal containment vessel, for a boiling water nuclear reactor, includes in one exemplary embodiment, a bottom head, a removable top head, and a substantially cylindrical sidewall extending from the bottom head to the top head. The bottom head, top head and cylindrical sidewall define a containment cavity sized to receive and enclose a reactor pressure vessel. The containment vessel has a pressure rating of at least about 50 atmospheres atm.

18 Claims, 2 Drawing Sheets

MODULAR REACTOR CONTAINMENT SYSTEM

BACKGROUND OF INVENTION

This invention relates generally to nuclear reactors, and more particularly, to containment systems in nuclear boiling water reactors.

One known boiling water reactor includes a reactor pressure vessel (RPV) positioned in a containment building or vessel, and a containment cooling system (CCS). A typical containment vessel includes both a drywell and an enclosed wetwell disposed in the containment vessel. The wetwell provides an additional source of cooling water for the reactor in the event of a pipe rupture or loss of coolant accident (LOCA). The CCS includes a passive containment cooling system (PCCS) having a heat exchanger submerged in a cooling pool located outside the containment vessel.

In the event of a LOCA, high-pressure fluid or steam is released from the RPV into the containment vessel. The steam is retained in the containment vessel, flows to PCCS and is condensed in the PCCS heat exchanger. The steam condensate collected in the condenser is returned to RPV or the containment vessel. Inside the RPV, the condensate is turned into steam by core decay heat and the steam flows back into the containment vessel. This produces a continuous process by which the reactor core is cooled by water over a period of time following the LOCA.

The containment vessel, in turn, is sized and configured to receive relatively high pressure and high temperature steam in the event of the LOCA. The containment vessel or building is typically a large volume structure made of thick reinforced concrete configured to contain a steam release. The large volume provides an expansion area for depressurization and control of the steam. The containment vessel is configured to contain low pressures, of about 2 atmospheres (atm) to about 3 atm (about 202 kilopascals (kPa) to about 303 kPa). The containment vessel also is effective as a radioactive boundary for containing the radioactive steam. Construction of the containment vessel and the support pad for the containment vessel is a complex event requiring significant time and resources at the reactor site.

SUMMARY OF INVENTION

In one aspect, a metal containment vessel for a boiling water nuclear reactor is provided. The containment vessel includes a bottom head, a removable top head, and a substantially cylindrical sidewall extending from the bottom head to the top head. The bottom head, top head and cylindrical sidewall define a containment cavity sized to receive and enclose a reactor pressure vessel. The containment vessel has a pressure rating of at least about 50 atm ($50.7 \times 10^2$ kPa).

In another aspect, a boiling water nuclear reactor is provided that includes a reactor pressure vessel, a reactor core located inside said reactor pressure vessel, and a metal containment vessel. The reactor pressure vessel is enclosed inside the containment vessel. The metal containment vessel includes a bottom head, a removable top head, and a substantially cylindrical sidewall extending from the bottom head to the top head. The bottom head, top head and cylindrical sidewall define a containment cavity sized to receive and enclose a reactor pressure vessel. The containment vessel has a pressure rating of at least about 50 atm.

DETAILED DESCRIPTION

A boiling water nuclear reactor with a compact metal containment vessel in accordance with an exemplary embodiment of the present invention is described below in more detail. The compact containment vessel is smaller than known containment vessels and can be shop fabricated off-site for quick installation on-site. The compact containment vessel is used instead of the known relatively large and expensive concrete or steel containment vessels having a large suppression pool of water that are designed to relatively low pressure ratings. The compact containment vessel has a relatively high pressure rating and is dry without a suppression pool.

The boiling water reactor with compact, dry containment vessel also employs a simple safety system which isolates and retains coolant inventory following a loss-of coolant accident (LOCA). The safety system is capable of maintaining core cooling and decay heat transfer using isolation condensers and equalizing lines without requiring coolant make-up from external sources.

Figure 1:
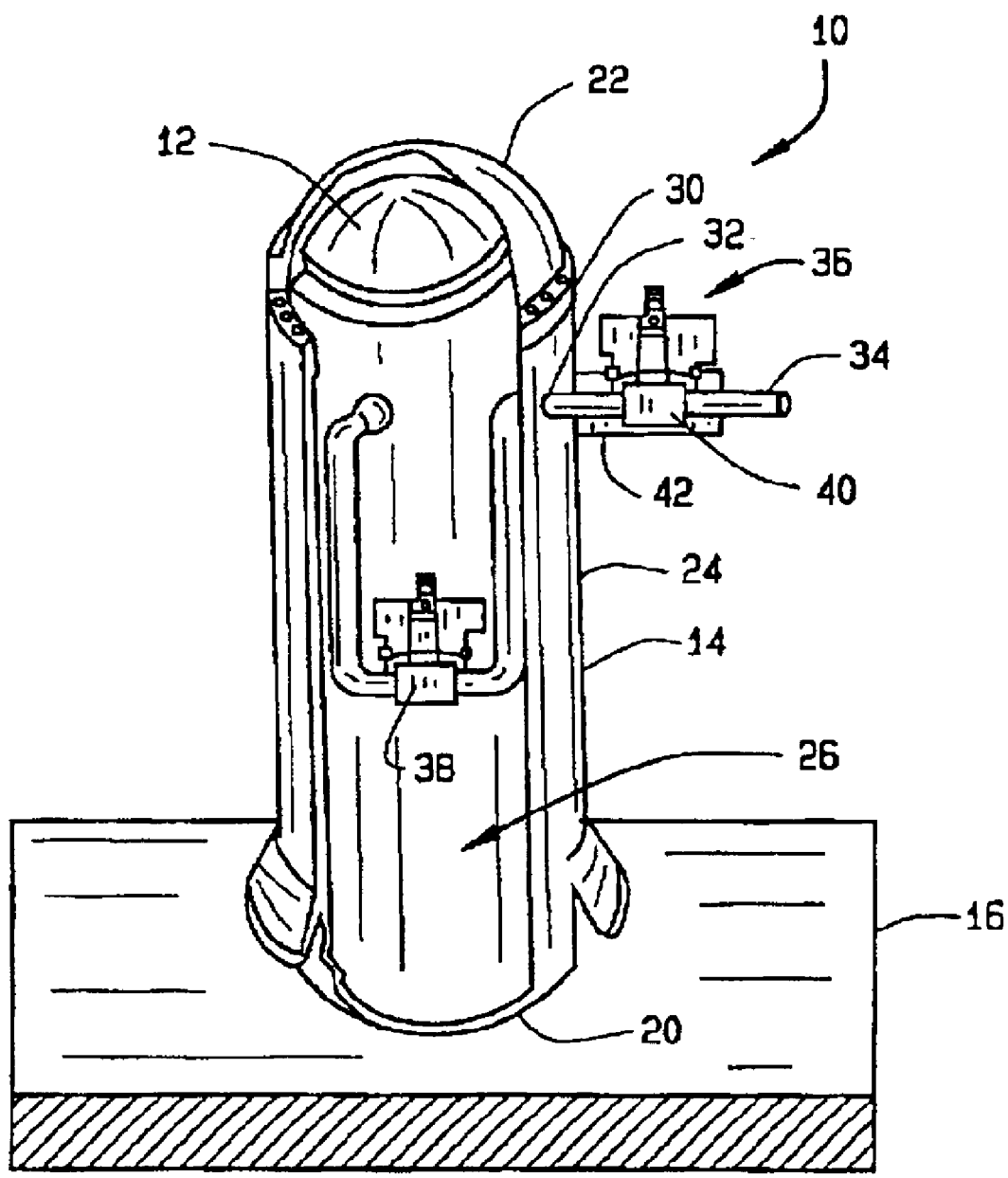
FIG. 1 is a schematic diagram of a boiling water nuclear reactor in accordance with an embodiment of the present invention.

Referring now to the drawings, FIG. 1 is a schematic diagram of a boiling water nuclear reactor 10 in accordance with an embodiment of the present invention. Reactor 10 includes a reactor pressure vessel (RPV) 12 located inside a containment vessel 14, which sits on a support pad 16. A reactor core 18 (shown in FIG. 2) is located inside reactor pressure vessel 12.

Containment vessel 14 includes a bottom head 20, a removable top head 22, a substantially cylindrical sidewall 24 extending from bottom head 20 to top head 22. Bottom head 20, cylindrical sidewall 24, and top head 22 define a containment cavity 26. Cavity 26 is of sufficient size so that RPV 12 is enclosed inside containment vessel 14. The area between RPV 12 and containment vessel 14 defines a drywell 28.

Sidewall 24 includes a top flange 30 which mates with removable top head 22. Top flange 30 facilities the installation of top head 22. Sidewall 24 is welded to bottom head 20 to provide a pressure-tight boundary. Sidewall 24, top head 22, and bottom head 20 are forged and machined from any suitable metal, for example, in one embodiment, from a low alloy steel. Low alloy steels contain small amounts of alloying materials such as nickel, chromium, silicon, manganese, tungsten molybdenum, and vanadium, to improve mechanical properties. In alternate embodiments, sidewall 24, top head 22, and bottom head 20 are clad with stainless steel to improve corrosion resistance.

Containment vessel 14 is capable of containing a high-pressure fluid, such as the steam, water and gas mixture anticipated in a loss of coolant accident (LOCA). Cylindrical sidewall 24 has a thickness sufficient to contain the high-pressure steam, water and gas mixture. In the exemplary embodiment, the thickness of cylindrical sidewall 24 is about 15 centimeters (cm) to about 30 cm, and containment vessel 14 is capable of containing fluid at pressures up to about 50 atm ($50.7 \times 10^2$ kPa) to about 150 atm ($151 \times 10^2$ kPa). The ability to contain high pressure fluid is referred to as a pressure rating. In alternate embodiments, the thickness of cylindrical sidewall 24 can be less than 15 cm or greater than 30 cm. Sidewall 24 thickness less than 15 cm can be used when containment pressures are expected to be below 50 atm during a LOCA, and sidewall 24 thickness greater than 30 cm can be used when containment pressures are expected to be greater than 150 atm during a LOCA.

Containment vessel 14 is relatively closely spaced from RPV 12. In the exemplary embodiment, containment vessel sidewall 24 is spaced about 1 meter from RPV 12 with cavity 26 having a volume slightly larger than the volume of RPV 12. The volume of cavity 26 in excess of the volume of RPV 12 is the volume available for expansion of high pressure gasses, for example steam, venting from RPV 12 during a LOCA. The ability of containment vessel 14 to contain high pressure fluids, up to about 150 atm, permits the size of containment vessel 14 to be less than known containment enclosures. In alternate embodiments, sidewall 24 is spaced greater than or less than 1 meter from RPV 12. The greater the spacing, the larger the volume inside containment cavity 26 is available for steam expansion and lowering pressures. The smaller the spacing, the smaller the volume inside containment cavity 26 is available for steam expansion which typically translates to higher pressures and the need for a thicker sidewall 24. The volume of cavity 26 is less than or equal to four times the volume of the volume of RPV 12.

In one embodiment, sidewall 24 and bottom head 20 are forged and machined into a substantially complete one piece unit at a location remote from support pad 16. More specifically, sidewall 24 and bottom head 20 are fabricated at a remote manufacturing facility while support pad 16 is constructed at the reactor site. Sidewall 24 and bottom head 20 are transported to the reactor site substantially ready to receive RPV 12 and associated internal components. Welding and machining is sometimes performed at the reactor site to install components in and through containment vessel 14.

In the exemplary embodiment, sidewall 24 includes a plurality of penetrations 32 (one shown). Sidewall penetrations 32 facilitate passage of a main steam line 34 and other lines, for example, feedwater lines, desired electrical system lines, and mechanical/hydraulic system lines, through containment vessel 14 to RPV 12. Each penetration 32 is hermetically sealed to facilitate containment of high-pressure fluid in containment vessel 14.

Isolation valves 36 facilitate sealing penetrations 32. Isolation valves 36 are coupled to sidewall penetrations 32. In the exemplary embodiment, a first isolation valve 38 is located inside containment cavity 26, between sidewall 24 and RPV 12, and a second isolation valve 40 is located outside sidewall 24, adjacent sidewall penetration 32. Sidewall 24 further includes a pipe guard 42 surrounding sidewall penetration 32. Pipe guard 42 extends from sidewall 24 to second isolation valve 40, and is configured to drain to containment vessel 14.

Figure 2:
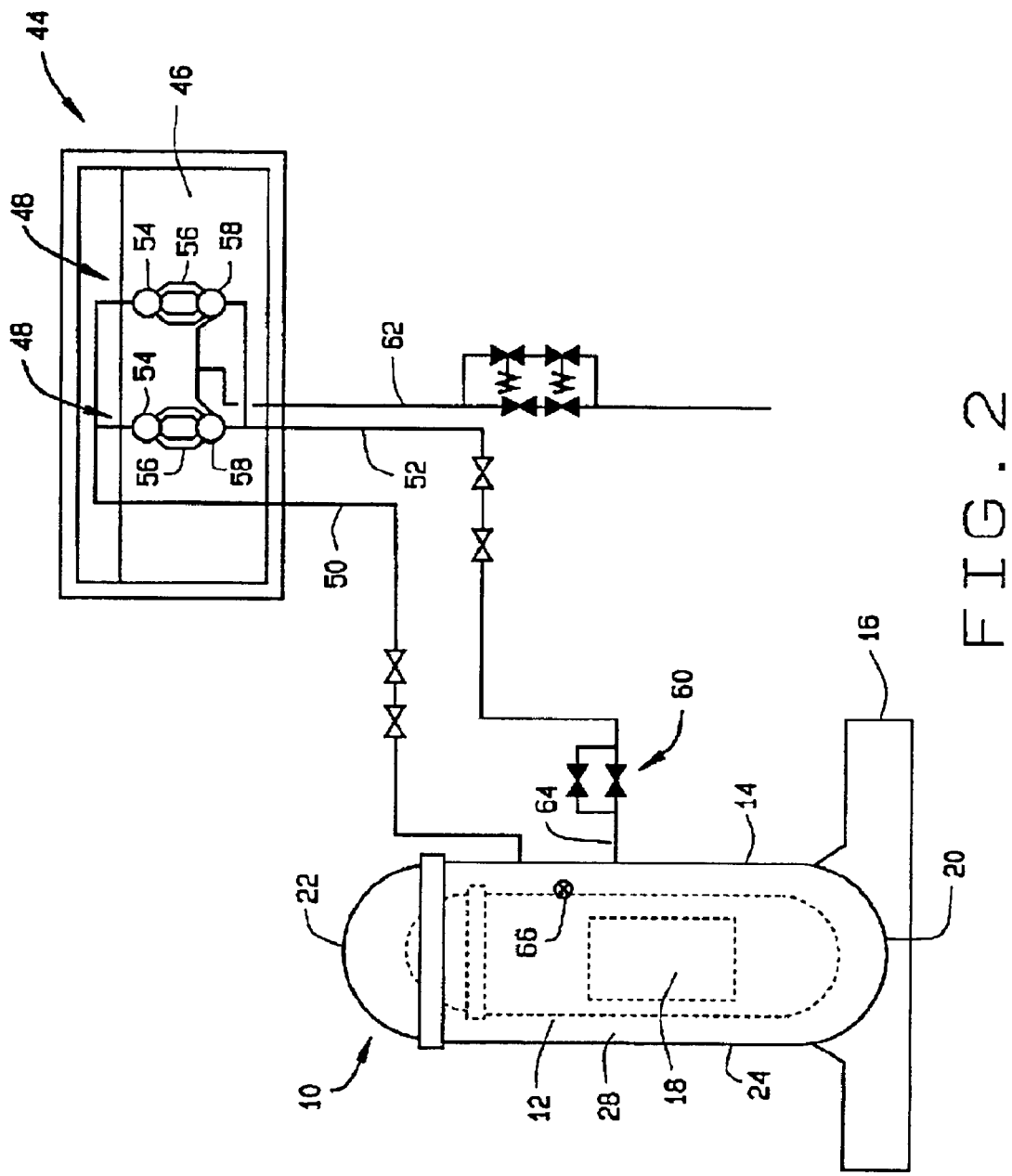
FIG. 2 is a schematic diagram of a containment vessel shown in FIG. 1.

Referring to FIG. 2, a containment cooling system (CCS) 44 is coupled to containment vessel 14. CCS 44 includes a cooling condenser pool of water 46, isolation condensers 48, an inlet line 50, and a condensate drain line 52. Cooling condenser pool of water 46 is located outside containment vessel 14. Isolation condensers 48 are submerged in cooling pool 46. Inlet line 50 extends from containment vessel 14 to isolation condensers 48 and provides fluid communication between condensers 48 and drywell 28. In the event of a LOCA, steam flows from drywell 28 through inlet line 50 to upper drums 54 of condensers 48 and into a condensing section 56 of each condenser 48 where steam is cooled condensed and collected in lower drums 58. Condensate drain line 52 extends from lower drums 58 of condensers 48 to valves 60. A vent line 62 extends from lower drums 58 to a radiation waste tank (not shown). An injection line 64 extends from valves 60 to drywell 28 and condensate drains to drywell 28 through condensate drain line 52, valves 60, and injection line 64. In another embodiment, injection line 64 extends into RPV 12 and condensate is returned directly to RPV 12.

RPV 12 is located in containment vessel drywell 28. Drywell 28 is dry under normal operating conditions, but may fill with water in a LOCA. Drywell 28 is in fluid communications with RPV 12 by at least one remotely actuated drywell valve 66. In a LOCA drywell valves 66 are opened on a low RPV water level to allow water from drywell 28 to flow into RPV 12.

In the event of a reactor LOCA, high pressure steam is released into containment vessel cavity 26. Containment vessel 14 contains the surge in pressure in containment vessel cavity 26 that is relatively similar in size to RPV 12. More specifically, containment vessel cavity 26 has a volume that is slightly larger than the volume of RPV 12, but less than about four times the volume of RPV 12, and can contain the high pressure steam at pressures up to about 50 atmospheres to about 150 atmospheres. Steam flows from drywell 28 through inlet line 50 to condensers 48 where the steam is cooled and condensed. The condensate is then returned to the RPV through condensate drain line 52 and injection line 64. The water collected in drywell 28 can be directed into RPV 12 through valves 66 thereby cooling the core.

The above described boiling water nuclear reactor 12 having a compact, dry containment vessel 14 which isolates and retains coolant inventory following a LOCA. The containment vessel is capable of maintaining core cooling and decay heat transfer using isolation cooling condensers 48 without requiring reactor coolant make-up from external sources. The containment vessel facilitates removal of residual heat by isolation condensers and the return of condensate to the reactor by isolation condenser discharge lines and/or equalizing lines. Further, containment vessel 14 facilitates remote, modular fabrication of the reduced volume, high pressure containment vessel, reducing construction time and costs.

While the invention has been described in terms of various specific embodiments, those skilled in the art will recognize that the invention can be practiced with modification within the spirit and scope of the claims.

What is claimed is:

1. A metal containment vessel for a boiling water nuclear reactor, the boiling water nuclear reactor comprising a reactor pressure vessel, said containment vessel comprising:
   a bottom head;
   a removable top head;
   a substantially cylindrical sidewall extending from said bottom head to said top head, said bottom head, top head and cylindrical sidewall defining a containment cavity sized to receive and enclose the reactor pressure vessel, said containment cavity comprising a containment cavity volume, said containment cavity volume less than 4 times the volume of the reactor pressure vessel, said containment vessel having a pressure rating of at least about 50 atmospheres;
   a drywell located inside said containment cavity; and
   a remotely actuated valve in flow communication with said drywell, said valve configured to connect to the pressure vessel.

2. A containment vessel in accordance with claim 1 wherein said containment vessel has a pressure rating of about 150 atmospheres or less.

3. A containment vessel in accordance with claim 1 wherein said metal containment vessel comprises is a low alloy steel.

4. A containment vessel in accordance with claim 1 wherein said sidewall comprises a plurality of penetrations.

5. A containment vessel in accordance with claim 4 wherein said sidewall comprises at least one pipe guard enclosing at least one of said plurality of penetrations, said pipe guard draining into said containment vessel.

6. A containment vessel in accordance with claim 4 further comprising a plurality of isolation valves coupled to said sidewall penetrations, said isolation valves positioned inside said containment cavity and between said sidewall and the reactor pressure vessel.

7. A containment vessel in accordance with claim 1 wherein said bottom head and said sidewall are forged and machined into a substantially complete one piece unit at a location remote from the nuclear reactor.

8. A containment vessel in accordance with claim 1 wherein said cylindrical sidewall comprises a thickness, said thickness comprising:
   at least about 15 centimeters; and
   not more than about 30 centimeters.

9. A boiling water nuclear reactor comprising:
   a reactor pressure vessel;
   a reactor core located inside said reactor pressure vessel; and
   a metal containment vessel, said reactor pressure vessel enclosed inside said containment vessel, said containment vessel comprising;
   a bottom head;
   a removable top head; and
   a substantially cylindrical sidewall extending from said bottom head to said top head, said bottom head, top head and cylindrical sidewall defining a containment cavity sized to receive and enclose said reactor pressure vessel, said containment cavity comprising a containment cavity volume, said containment cavity volume less than 4 times the volume of said reactor pressure vessel, said containment vessel having a pressure rating of at least about 50 atmospheres.

10. A reactor in accordance with claim 9 wherein said containment vessel has a pressure rating of about 150 atmospheres or less.

11. A reactor in accordance with claim 9 wherein said metal containment vessel comprises is a low alloy steel.

12. A reactor in accordance with claim 9 said containment vessel further comprising a drywell isolated from said reactor pressure vessel by a remotely actuated valve.

13. A reactor in accordance with claim 9 wherein said containment vessel sidewall comprises a plurality of penetrations.

14. A reactor in accordance with claim 13 wherein said sidewall comprises at least one pipe guard enclosing at least one of said plurality of penetrations, said pipe guard draining into said containment vessel.

15. A reactor in accordance with claim 13 further comprising a plurality of isolation valves coupled to said containment vessel sidewall penetrations, said isolation valves positioned between said containment vessel sidewall and said reactor pressure vessel.

16. A reactor in accordance with claim 9 further comprising an isolation condenser outside said containment vessel sidewall.

17. A reactor in accordance with claim 9 wherein said containment vessel bottom head and said containment vessel sidewall are forged and machined into a substantially complete one piece unit at a location remote from said reactor.

18. A reactor in accordance with claim 9 wherein said containment vessel cylindrical sidewall comprises a thickness, said thickness comprising:
   at least about 15 centimeters; and
   not more than about 30 centimeters.

* * * * *